April 27, 1943.  E. E. LINDSEY  2,317,624
DEVICE FOR MAKING FROZEN CONFECTIONS
Filed Nov. 30, 1937  3 Sheets-Sheet 1
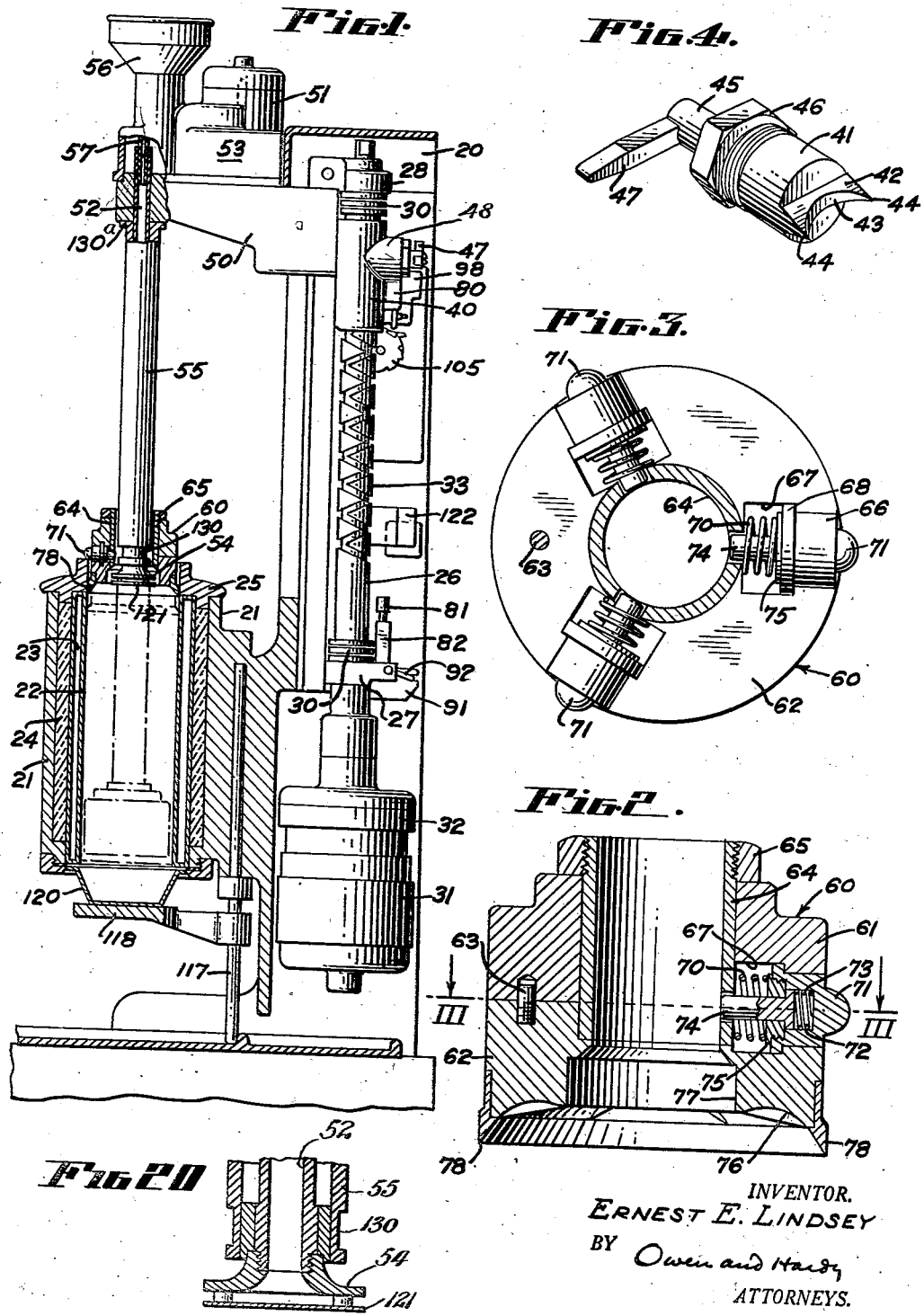
INVENTOR.
ERNEST E. LINDSEY
BY Owen and Hardy
ATTORNEYS.

April 27, 1943.   E. E. LINDSEY   2,317,624
DEVICE FOR MAKING FROZEN CONFECTIONS
Filed Nov. 30, 1937   3 Sheets-Sheet 2
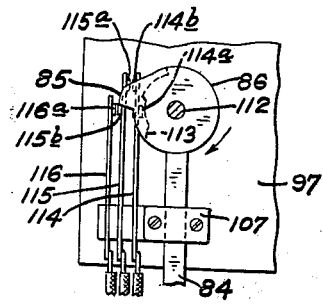
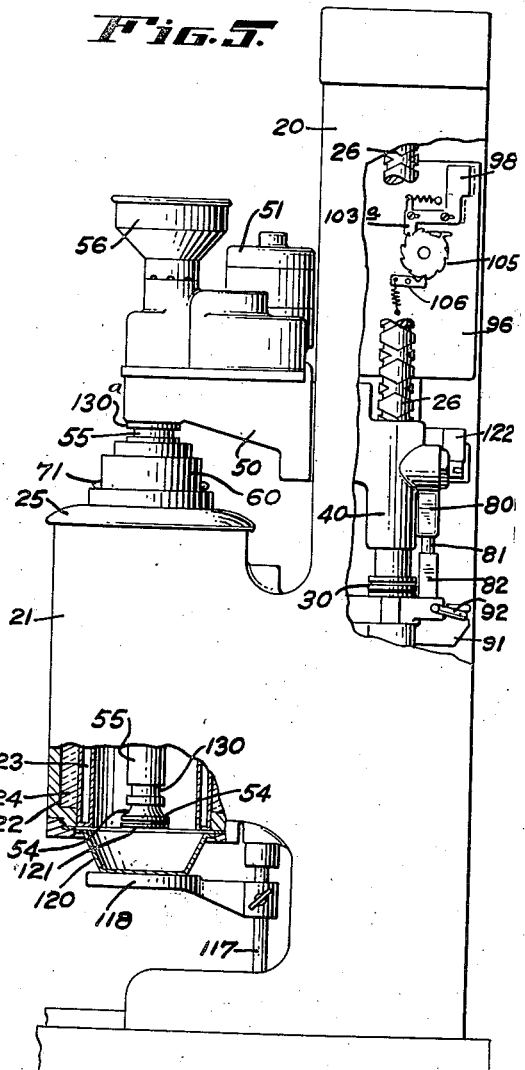
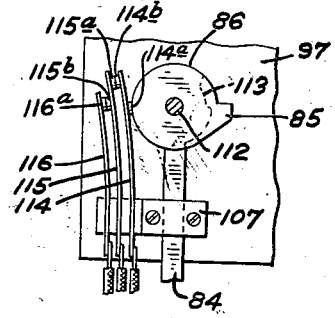
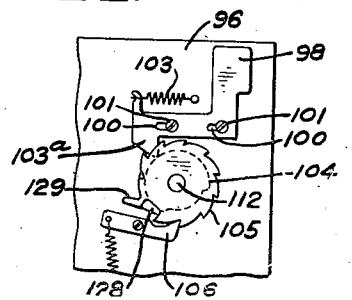
INVENTOR.
ERNEST E. LINDSEY.
BY Owen and Hardy
ATTORNEYS.

April 27, 1943.  E. E. LINDSEY  2,317,624
DEVICE FOR MAKING FROZEN CONFECTIONS
Filed Nov. 30, 1937  3 Sheets-Sheet 3
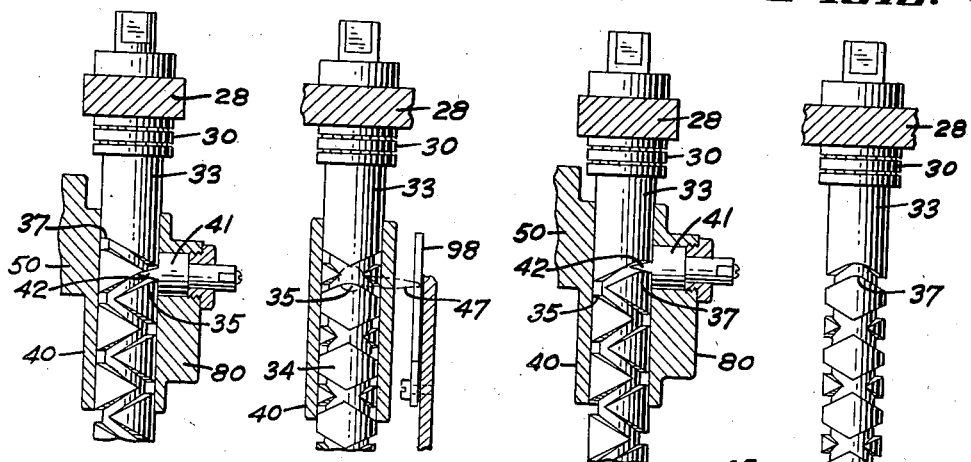
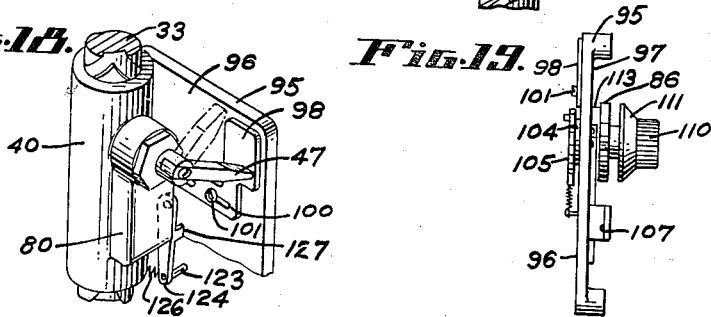
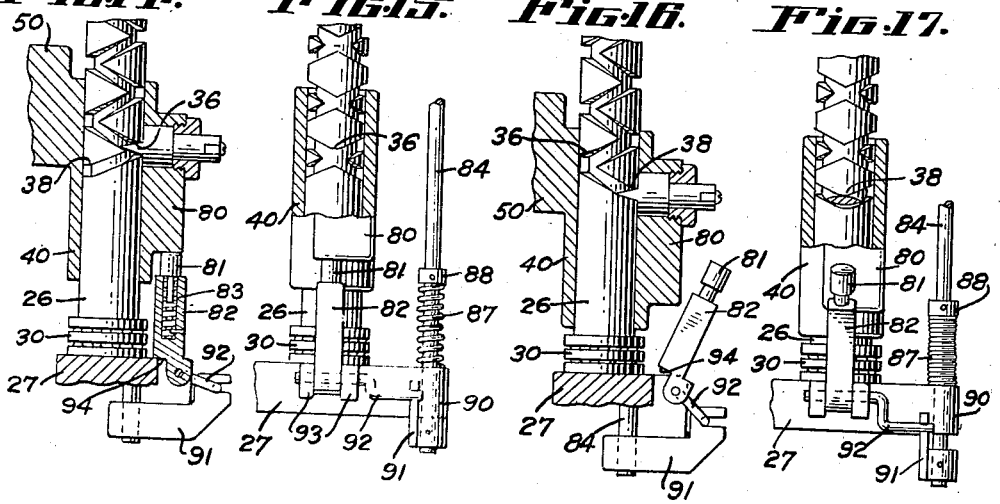
INVENTOR.
ERNEST E. LINDSEY.
BY Owen and Hardy
ATTORNEYS.

Patented Apr. 27, 1943

2,317,624

UNITED STATES PATENT OFFICE 2,317,624

DEVICE FOR MAKING FROZEN CONFECTIONS

Ernest E. Lindsey, Los Angeles, Calif., assignor to Insta-Freeze Corporation, a corporation of California Application November 30, 1937, Serial No. 177,267

10 Claims. (Cl. 62—114)

This invention relates to devices for making frozen and partially frozen confections and the like of the type which is prepared by instantaneous freezing in thin layers and without the formation of large ice crystals, and more particularly to the method and means for removing the finished confection from the freezing zone and in the control of the entire operation.

The present device is an improvement, among other things, on those which are the subject matter of United States Letters Patent Nos. 1,965,901, and 2,025,757.

Among the objects of the present invention are to provide a device wherein the freezing (or partial freezing) and dispensing, including the molding of the confection in the dish, is one continuous operation of the device; to provide a device where such freezing, dispensing and molding are accomplished without stopping the device and without stopping either or both motors; where the cutter head or cutting piston comes into operative engagement without stopping the device, and manually placing it in engaged position; to provide a device in which, the cutter head or cutter piston immediately after cutting or peeling of the confection from the cylinder wall and upon return travel will resume inoperative position without manual adjustment; where the cutter head after making its one complete circuit of travel will resume its inoperative position without manual control or adjustment and which will leave the shaft in condition for the next charge for serving; to provide a device where the only manual operations involved are to pour the charge for the serving into the device and to turn the starting switch, thus doing away with all except the most elemental of manual efforts; to provide a device which, after starting, will continue to operate until completion of the confection and dispensing without further manipulation and control, thus permitting the operator to go about other things, or the preparation of other charges for servings.

The invention contemplates such other and further objects as will appear as the description of the invention proceeds.

In attaining the foregoing objects, together with such further benefits, advantages and capabilities as may hereinafter appear, and as are inherently possessed thereby, there is used by way of example only, the construction shown in preferred form in the accompanying three sheets of drawings, wherein similar parts are designated by the same reference characters in the several views.

Referring to the drawings:

Fig. 1 is a vertical section of the complete device, showing in broken lines within the freezing cylinder, two other positions of the cutter head;

Fig. 2 is an enlarged view in vertical section of the cutter head;

Fig. 3 is a transverse section of the cutter head taken along the line III—III in Fig. 2;

Fig. 4 is an enlarged perspective view of the swiveled "dog" member.

Fig. 5 is a side elevational view of the device with a section cylinder broken away and shown in section and a portion of the housing broken away to show the position of the various members at the end of the down stroke;

Fig. 6 shows the switch actuating mechanism on one side of the switch block when turned to "off" position on the dial;

Fig. 7 shows the switch control mechanism of Fig. 6, but on the other side of the switch block when in "off" position on the dial;

Fig. 8 shows the switch actuating mechanism on one side of the switch block when turned to No. 5 on the dial;

Fig. 9 shows the switch control mechanism on the other side of the switch block when turned to #5 on the dial;

Fig. 10 is a fragmentary side elevation at the top of the shaft showing the blade of the swiveled "dog" member at the point of reverse at the top of the normal stroke;

Fig. 11 is a similar view in front elevation;

Fig. 12 is a fragmentary side elevation of a portion of the shaft at the top thereof showing the blade of the swiveled "dog" member at the point of reverse at the extremity of the full or extended stroke;

Fig. 13 is a similar view in front elevation;

Fig. 14 is a fragmentary view in side elevation of a portion of the bottom of the shaft, with the blade of the swiveled "dog" member at the point of reversal at the end of the short or normal stroke;

Fig. 15 is a similar view in front elevation;

Fig. 16 is a fragmentary view in side elevation of a portion of the bottom of the shaft showing the swiveled "dog" member at the point of reversal at the bottom of the full or extended stroke;

Fig. 17 is a view similar to Fig. 16 but in front elevation.

Fig. 18 is a fragmentary view in perspective showing the arm attached to the swiveled "dog" member in contact with the switch trigger mechanism; and Fig. 19 is an end or side elevation of the switch block and mechanism;

Fig. 20 is an enlarged sectional detail of the spray head.

Referring now more particularly to the drawings and with particular reference to Fig. 1, the entire device is built in and around the housing 20. Suitably attached to or integral with the housing is a cylindrical member 21 having a smooth inner face 22. Between the inner face 22 and the outer wall of the cylinder there is provided a non-communicating chamber 23 forming a brine channel which may be connected to a suitable circulating system of a refrigerator by means and methods not herein shown, the object being to make the smooth inner face 22 a refrigerating or freezing wall. Between the refrigerant chamber 23 and the outer wall of the cylindrical member 21 there is provided suitable insulating material 24 to keep the low temperature directed inwardly. The assembly is held in non-communicating and tight position by the cap member 25 centrally bored to the same diameter as the inner face 22 and is substantially a continuation thereof.

Inside of the housing 20, parallel with the axis of the cylindrical member 21 and lying in the same vertical plane, is the axis of shaft 26 which is supported by and journaled in cross-webs 27 and 28, which run transversely of the housing 20. Suitable bearings 30 are provided for smooth even running and are preferably ball bearings. Shaft 26 is rotated by motor 31 either directly or through a reduction gear 32 or other similar and suitable speed reducing device where the speed of the motor is too fast for the rate of rotation desired.

The shaft 26 is provided with double cut reversing screw threads forming the intersecting grooves 33. These screw threads or grooves meet and join at both extremities and define the limit of the maximum stroke of which the device is capable. These grooves also form a continuous path up and down along the shaft 26. The crossing and recrossing of these threads or grooves 33 form identically spaced diamond shaped units 34 along the shaft when viewed in either front or rear elevation as is clearly shown in Figs. 11, 13, 15 and 17. At the point of reversal these lozenge shaped units have one of the obtuse angles rounded to aid and promote a smooth reversal of direction. Thus, for the short or normal stroke which is less than the full length of the grooves, the points are rounded as at 35 and 36, and for the full stroke, or what we shall term the extended stroke, they are rounded as at 37 and 38.

Adapted to travel in said grooves 33 and move bearing sleeve member 40 is the swiveled "dog" member 41. Engagement in the groove is accomplished by the blade 42 which is generally wedge shaped in cross section as is clearly shown in Fig. 4. The median portion of the blade 42 is cut away as at 43 and shaped so as to conform to the arc of the same diameter as the shaft 26 at the bottom of the grooves 33. This, in effect, results in teeth-like projections 44 at the marginal portions of the blade 42 which are spaced a sufficient distance apart to bridge over the intersections of the grooves and to form a sufficient bearing surface on both sides thereof in the same direction of travel. They are not, however, too widely spaced so as to prevent an easy reversal of direction at the rounded portions already mentioned. The swiveled "dog" member 41 has an outwardly extending stub shaft 45 of smaller diameter than the base portion, which passes through a central opening in threaded nut 46, and rides freely therein. At the outer extremity of the stub shaft 45 is attached a contact arm 47, the longitudinal axis of which lies in the same plane of direction as the blade 42. Although the nut 46 is loosely mounted on the stub shaft 45, it is retained between the contact arm 47, and the base portion of the swiveled "dog" member 41.

Around a portion of the shaft 26 is the sleeve bearing member 40 which is adapted to travel up and down along the said shaft in response to the traveling of the swiveled "dog" member in the grooves 33 as the shaft rotates. This sleeve member 40 is roughly cylindrical in shape and has a turret portion 48 extending at right angles therefrom. The turret has a hole bored completely therethrough to the shaft 33 and is of sufficient diameter to permit free rotation of the swiveled "dog" member 41 which rides therein. This opening is threaded at the top to engage the threads of the threaded nut 46. Obviously, the threaded nut 46 is to hold the blade of the swiveled "dog" member in operative position in the grooves 33 of the shaft 26. In this manner the rotary movement provided by the motor rotating the shaft 26 is transformed into reciprocating movement up and down the shaft by the sleeve member 40 slidably mounted thereon in response to the traveling of the swiveled "dog" member and its blade in the grooves of the shaft.

Attached to the bearing sleeve 40 in any suitable way, or even made integral therewith, is an elevator bracket 50 which carries the reciprocating movement to useful activity in the device. Suitably mounted on the elevator bracket 50 is motor 51, which, by means of belts and pulleys (not shown) rotates the hollow inner spindle 52, the moving links for which are covered by the housing 53. At the free end of the spindle 52 is a spray head 54. Rigidly mounted on said elevated bracket 50 is outer spindle 55 which is stationary with respect to rotary movement, but, of course, moves up and down with the bracket 50 and protects the rotating hollow inner spindle 52.

Also carried by and mounted on the elevated bracket 50 is the funnel assembly 56 which has various sized openings which are adapted to be adjusted to drain into the rotating inner spindle by means of the duct 57, which spindle will convey the liquid to the spray head 54.

The cutter head, which is generally designated by the numeral 60, is intended to operate in the fashion of a piston when in operative engagement, and freely moves within the hollow interior of the cylinder 21. The central body portion which is centrally bored large enough to permit the free passage of spindle 55 therethrough, is preferably made in two parts—top 61 and bottom 62—and cast in some sort of suitable plastic material, such as Bakelite, Lumerath, Redmonite, or any suitable material, which parts, 61 and 62, are positioned by pin 63. Around the central bore is a bearing member 64 which is loosely fitting with respect to outer spindle 55 so that the latter may freely pass through. This bearing member 64 is threaded at the top portion to receive the threaded collar member 65 which holds the cutter head assembly substantially together. In the cutter head 60 are positioned plungers 66 which are best understood by reference to Figs. 2 and 3. They are preferably cylindrical in shape and made of metal, and are further adapted to be placed in a shouldered recess 67 in the cutter head 60. The annular flange portion 69 rests against the shoulder of the recess and forms a stop against the outward pressure of the helical spring 70. The knob 71 projects outwardly beyond the circumference of the cutter head and beyond the point of the inner diameter of the inner cylinder space 22. These plungers are adapted to be compressed inwardly (exerting outward pressure) against the spring 70. Also, these plungers are adapted for inward pressure and are therefore provided with a centrally bored chamber 72 which contains a helical spring 73 exerting pressure on the head of pin 74. The head of the pin 74 is confined within the chamber 72 by means of threaded cap member 75 through which the shank of the pin 74 passes freely. Thus, it will be seen that as pressure is exerted against the knob 71, thereby compressing the helical spring 70, the pin 74 is thrust through an appropriate opening in the bearing sleeve 64 where it, in turn, may receive pressure from the inside and compress helical spring 73. The normal pressure and position is that shown in Figs. 2 and 3, but obviously, both plungers and pins may be compressed at the same time. The lower portion of the cutter head 62 may have a concave design as at 76 which can be impressed upon the confection at the time of dispensing. Also, there is a recessed portion 77 which is adapted to receive the spray head during the dispensing operation. Furthermore, the lower portion of the cutter head is supplied with a sharp cutting edge 78 which extends to the inner surface 22 of the cylindrical portion 21 and is adapted to scrape the frozen confection from the refrigerated surface.

The cylindrical bearing sleeve member 40 has a raised portion 80, made integral therewith which is adapted to engage the plunger 81 of the stop portion 82 compressing the helical spring 83 therein, when the stop member 82 is in operative position such as is shown in detail in Figs. 14 and 15. When push rod 84, which is substantially parallel to the shaft 26 and adjacent thereto, is pushed downwardly by the peripheral lug 85 on the push rod actuating cam 86, the stop member 82 is taken out of operative position by compressing the spring 87 between the collar 88 and the ear 90 on the cross-web 27 through which the shaft passes, thereby moving the forked member 91 downwardly. In this downward motion the forked member is engaged with crank 92 which rotates in parallel ear members 93, likewise attached to the cross-web 27 and being securely attached to the stop member 82, moves it out of operative engagement upon being depressed. Stop member 82 has a shoulder portion 94 which rests on the cross-web 27 when in operative position and gives it substantial support.

The means for controlling the device are best understood by reference to Figs 6 to 9 inclusive, 18 and 19. Mounted on the inside of the housing 20 and adjacent to shaft 26 is a suitable switch block 95. This is preferably in the form of a panel having two available faces, an inside face 96, and an outside face 97. On the inside face 96 is mounted a trigger switch plate 98, which rides smoothly within the limits of slots 100 on screws 101. Tension spring 103 tends to urge the trigger plate at all times to the position which is shown in broken lines in Fig. 7 and in full lines in Fig. 9, and keeps the leg 103a in contact with the cam 104, which is integral with ratchet 105, as a cam follower. Spring pawl 106 is pivotally mounted on this surface to hold ratchet 105 against reverse movement.

On the outside face 97 of the switch block 95 is mounted bracket 107 for slidably positioning push rod 84. The manual control for starting the device is by means of knob 110 which is positioned on the outside of the housing 20. Forming a part of the knob 110, and also on the outside of the housing is the dial 111, which has numerals marked on its surface for setting the operation, depending upon the number of round trips or complete circuits the operator wishes the elevator bracket to travel. The knob 110 has a central shaft 112 to which are attached on the inside face of the switch block the ratchet 105 and the cam 104 and electrical circuit cam 113 and push rod cam 86 on the outside face, all of which are adapted to be moved in unison upon rotation of the knob to the position desired, and the setting device, or by any rotation of the shaft 112.

Also positioned on the outside face of the switch block 95 are flexible contact switch poles 114, 115 and 116. On pole 114 there are two contact points, i. e., 114a which acts as a cam follower moving in accordance with the contour of the cam 113, and the other 114b making contact with the live-wire contact point 115a to close the circuit and operate the motor 31. Likewise switch pole 115 has two contact points, the first being 115a and the second 115b which makes contact with point 116a for closing the circuit and operating the motor 51.

Adjacent the dispensing outlet of the cylinder 22 is positioned a rod 117 on which is a platform 118 slidably mounted for adjustable positioning. The receptacle 120 into which the confection is dispensed and formed may be placed on this platform.

*Operation*

Both of the motors 31 and 51 rotate in one direction only, and for the purpose of the description of the operation herein, it will be assumed that the rotation of motors 31 and 51 will be counter-clockwise when the shaft 26 and motor 51 are viewed from the top, or from left to right when viewed in the various figures herein.

The operation of both motors 31 and 51, and the rotation therefore of shaft 26 and hollow spindle 52 are normally subject to the control of the selective switch and the setting of the knob 110. The knob 110 has a dial thereon 111 equipped with numbers corresponding to complete circuits of travel of the elevator bracket 50. For example, if the knob of the selective switch is turned and set to the numeral 5 on the dial 111, motor 31 and motor 51 will both start and the elevator arm 50 will make five round trips before coming to a stop. This is regardless of whether or not the strokes are the normal strokes, or whether there is an extra or overtravel at either end thereof, and also regardless of the independent shutting off of the motor 51 at the end of the upward portion of the fourth stroke.

For the purpose of making the description clear it will be assumed at the outset that the dial setting is in "off" position with all contacts broken, such as is shown in Figs. 6 and 7 and the device completely at rest substantially as shown in full lines in Fig. 1.

When the operator has selected the particular liquid to make the frozen confection, it is poured in the funnel 56 which is turned to the appropriate sized opening, depending upon the rate of flow desired or required for draining through conduit 57 into the hollow rotating spindle 52. While this is being done, the device is started by turning the knob 110 to the numeral 5, for example. The turning of the knob and the dial rotates the ratchet 105 and cams 104, 113 and 86 to the positions shown substantially in Figs. 8 and 9. It will be seen in Fig. 8 that immediately upon the setting, contacts 115 and 114b are closed to start the motor 31 which rotates shaft 26 and also contacts 115a and 116a are closed to operate the motor 51 and rotate the inner spindle 52.

It should also be said that at the starting, the bearing sleeve member 40 is at the top of the stroke, i. e., the top of the extended stroke, and immediately upon the rotation of shaft 26, begins its downward portion of stroke one carrying with it the elevator bracket 50 and its assembly. It is apparent, therefore, that as the elevator bracket and its assembly move downwardly and upwardly, the confection to be frozen flows down inside of the hollow spindle 52 and strikes plate 121 which is likewise rotating, and by centrifugal force is sprayed on the inner surface 22 which is refrigerated. Because the confection is sprayed in fine particles, it is frozen almost instantaneously, and because of the deposition in successive layers, the confection is of creamy consistency without any large ice particles.

At the bottom of the down portion of the first stroke, the position of the device will be substantially that shown in Fig. 5. The reversal at this point is caused by the built up portion 80 on the bearing sleeve member 40 engaging the head 81 of the piston in the stop member 82, which causes the swiveled "dog" member 41 to reverse at the point 36 on the shaft 26 which is short of the full or extended travel on the down stroke. The bearing sleeve member 40 will now start on the upward portion of the first circuit. The full travel of the piston head 81 compressing spring 83 is reached precisely at the moment of reverse at the point 36 which is the normal stroke, and the restraint of contacting the stop member with the aid of bracket 122 to support any possible strain is sufficient to cause the swiveled "dog" member to reverse its direction and start on its upward portion of the stroke. On the way up, the lifting pawl 123 carried on arm 124 which is pivotally attached and mounted on the built up portion 80 and held in operative position by spring 126, engages a tooth on the ratchet 105 and rotates the shaft 112 causing the dial 111 to likewise rotate and turn back one space to the numeral 4. When the blade 42 of the swiveled "dog" member 41 traveling in the groove 33 reaches the rounded point 35 on the shaft 26, it will follow the easier course and reverse to go down on the downward portion of stroke 2, precisely as is shown in Figs. 10 and 11. There is sufficient weight and balance as well as downward pull to make this the easier course, although obviously, precisely the same means as used at the bottom could be used at the top for reversing the motion short of the full or extended stroke. Strokes 2 and 3 are substantially the same as stroke 1, with the lifting pawl 123 engaging a ratchet tooth at the upper portion of the travel and rotating the shaft 112 one space on the dial 111 at each time.

All during the upward and downward portions of strikes 1, 2 and 3, and the downward portion of stroke 4, the confection to be frozen has been distributed centrifugally by a fine spray and laid down in successive layers on the inside of the cylinder walls 22. On the downward portion of the stroke 4, the lugs 85 on cam 86 push downwardly on the push rod 84 compressing the spring 87 and depressing the fork 91 and the crank arm 92, causing the stop 82 and the piston 81 to swing outwardly on its pivot and out of engaging position, permitting the bearing sleeve member 40 and its built up portion 80 to make the full or extended travel of the down portion of this stroke 4. This down portion of stroke 4 is sufficient to cause the solid portion 130a of the elevator bracket 50 to exert pressure on the top of the cutter head at the collar member 65 thereby compressing the plungers 66 and pushing the cutter head down into the cylinder 21 substantially to the position shown at the top of the cylinder in broken lines in Fig. 1. On the upward portion of stroke 4, spindle 55 rides smoothly through the cutter head 60, and although compressed, the pins 70 ride smoothly thereon without interference in the upward travel of the spindle 55 and without moving the cutter head 60. At the upstroke of 4, the electrical circuit cam 104 has been moved to the position where the contact 115b and 116a is broken, thus shutting off the motor 51 and stopping the rotation of the inner spindle 52. There being nothing to cause the overtravel at the top immediately upon reaching the point 35, the blade of the swiveled "dog" member begins the downward portion of stroke 5. Immediately upon reaching the up portion of stroke 4, the outer spindle has moved to a position where the annular groove 130 is in register with pins 74. The tension on the pins 74 is thereby released and they engage in the annular groove 130 in the outer shaft 55. Thus, on the downward portion of stroke 5, the cutter head is moved downwardly by means of the shaft or spindle 55, and piston blade 78 cuts or scrapes the confection from the interior of the cylinder 21, along face 22. The scrapings or cuttings are deposited in a receptacle 120 suitably positioned, and at the downward extremity of stroke 5, which is substantially that shown in broken lines in Fig. 1 at the bottom of the cylinder 21, there is sufficient travel so that the cutter head exerts a pressure on the top of the confection and forms or molds it into the precise design which is molded in the cutter head as described at 76. Any suitable form or shape may be adopted. The upward portion of stroke 5, which is the last stroke is merely a resetting stroke. On this upward portion of stroke 5, the lip 127 also carried on arm 124 engages a projecting lug 128 on ratchet 105 and causes the shaft 112 to rotate one position, each ratchet stop being one position and this is immediately followed by the lifting pawl 123 engaging an extended tooth 129 on ratchet 105 causing the dial 111 to turn back one more space so that on the last up stroke the shaft 112 is rotated twice and the dial moved two spaces. As the bearing sleeve approaches the upper portion of its travel, the trigger plate 98 is released to move into operative engagement with the extremity of contact arm 47. The release of the trigger plate to operative position is controlled by the cam 104. The trigger plate 98 is so positioned as to hold the arm 47 in the position substantially shown in Fig. 8 so that the blade 44 of the swiveled "dog" member will be maintained in the same position as that held in its upward travel until after it has crossed the intersection at 35 where it would normally reverse and go downward were it not restrained. Thereby the swiveled "dog" member is directed and continues for the full length of the stroke, or the extended travel on the upstroke. On the extended travel at the top, the cutter head 60 is pulled out of the cylinder freeing the plungers 66, returning them to normal position, and therefore disengaging the inner pin from the annular groove 130 in the outer spindle 55. Immediately upon the completion of the five complete circuits of the setting the cam 113 has been returned to "off" position, shown in Figs. 6 and 7 and the contact is therefore broken between contacts 114b and 115a, stopping the motor 31 and returning the whole device to the position shown in Fig. 1 and at rest.

Obviously, the device can be given any one of a number of settings provided for on the dial, and any different or other course of travel by changing the shapes of the cams 104, 113 and 86, as well as ratchet 105. It is to be understood that the invention herein described and illustrated is by way of example only, and is capable of modification and change and comprehends other details and constructions without departing from the concept or the spirit of the invention.

I claim:

1. Means for dispensing frozen confection from a freezing chamber having a refrigerated wall, comprising a cutter head adapted to remain in alignment but out of contact with said refrigerated wall and out of operative engagement during the freezing period, a reciprocating spindle passing therethrough, means for placing said cutter head in operative position and self-releasing and engaging means within the said cutter head for engaging the spindle when said cutter head is moved to operative position and disengaging when moved to inoperative position.

2. Means for dispensing frozen confection from a freezing chamber having a refrigerated wall, comprising a piston-like cutter head adapted to remain in alignment but out of contact with said refrigerated wall and out of operative engagement during the freezing period, having a cutting edge for cutting and scraping the frozen confection, means for placing said cutter head in operative position, a reciprocating spindle passing therethrough and self-releasing and engaging means within said cutter head for engaging the spindle when said cutter head is moved to operative position and disengaging when moved to inoperative position.

3. In a machine for making frozen confection, means for dispensing said confection from a freezing chamber having a refrigerated wall, comprising a cutter head positioned in alignment but out of contact with said refrigerated wall and out of operative engagement during the freezing period, means for putting said cutter head in and out of operative position with respect to said refrigerated wall, means within said cutter head automatically engaging for driving said cutter head in the removal of the frozen confection from said freezing chamber and means within said cutter head for automatic disengagement upon return to inoperative position.

4. In a machine for making frozen confections, means for dispensing said confection from a freezing chamber having a refrigerated wall, comprising a cutter head having a cutting edge for removing the frozen confection, positioned in alignment but out of operative engagement during the freezing period, means for putting said cutter head in and out of operative position with respect to said refrigerated wall, means for engaging and driving said cutter head in the removal of the frozen confection from said freezing chamber and means within said cutter head for automatic engagement with said driving means and for automatic disengagement upon return to inoperative position.

5. In a device for freezing confections wherein the same are sprayed in successive layers on the inner wall of a refrigerated cylinder, dispensing means comprising a piston like head positioned above but in alignment with the refrigerated cylinder during the freezing period, reciprocating traveling means adapted to push the said piston like head into operative position, return and push said head through the said cylinder to remove the frozen confection, and replace said head in its first mentioned position always as one continuous, complete operation where the removal immediately follows the freezing period.

6. In a device for freezing confections wherein the same are sprayed in successive layers on the inner wall of a refrigerated cylinder, dispensing means comprising a piston like cutter head positioned above but in alignment with the refrigerated cylinder during the freezing period, reciprocating traveling means adapted to push the said piston like head into operative position within the said cylinder at the end of the freezing period, return and push said head through the said cylinder to remove the frozen confection and replace said head in its first mentioned position and means for controlling the duration of operation of the reciprocating traveling means, all acting in sequence to accomplish one continuous, complete operation wherein the operation of the dispensing means immediately follows the freezing period.

7. In a device for freezing confections wherein the same are sprayed in successive layers on the inner wall of a refrigerated cylinder, dispensing means comprising a piston like cutter head having a sharpened edge adapted to extend to the inner wall of the cylinder positioned above but in alignment with the refrigerated cylinder during the freezing period, reciprocating traveling means adapted to push the said piston like head into operative position within the said cylinder at the end of the freezing period, return and push said head through the said cylinder to remove the frozen confection and replace said head in its first mentioned position and means for controlling the duration of operation of the reciprocating traveling means, all acting in sequence to accomplish one continuous, complete operation wherein the operation of the dispensing means immediately follows the freezing period.

8. In a device for freezing confections wherein the same are sprayed in successive layers on the inner wall of a refrigerated cylinder, dispensing means comprising a piston like cutter head having a sharpened edge adapted to extend to the inner wall of the cylinder and having a design formed in its lower face positioned above but in alignment with the refrigerated cylinder during the freezing period, reciprocating traveling means adapted to push the said piston like head into operative position within the said cylinder at the end of the freezing period, return and push said head through the said cylinder to remove the frozen confection, impress the design of the lower face in the removed frozen confection, and replace said head in its first mentioned position and means for controlling the duration of operation for the reciprocating traveling means, all acting to accomplish in sequence one continuous, complete operation where the removal of the confection immediately follows the freezing period.

9. In a machine for freezing confections wherein the material to be frozen is deposited in successive layers on a surface adapted to be cooled below the freezing point of said mixture, including in combination, a cutter head positioned above but in alignment with the freezing surface when out of operative position, a sharpened edge on said cutter head adapted to extend to the freezing surface, a reciprocating traveling means, means for putting said cutter head in operative position, means within said cutter head when placed in operative position to automatically engage a portion of said reciprocating traveling means, said engaging means being self-releasing when the said cutter head is returned to inoperative position and means for controlling the duration of operation of the reciprocating traveling means whereby the operation of the cutter head immediately follows as the last cycle of reciprocation, all as one continuous, complete operation.

10. In a machine for freezing confections wherein the material to be frozen is deposited in successive layers on a surface adapted to be cooled below the freezing point of said mixture, including in combination, a cutter head positioned above the freezing surface when out of operative position, a sharpened edge on said cutter head extending the freezing surface, and a reciprocating traveling means, a portion of which is adapted to place the cutter head in operative position and when so positioned engages therewith to remove the confection from the freezing surface and returns it to inoperative position as a continuous operation.

ERNEST E. LINDSEY.